US010994932B2

(12) United States Patent
Umeda et al.

(10) Patent No.: US 10,994,932 B2
(45) Date of Patent: May 4, 2021

(54) STOCK CONTROL SYSTEM, STOCK CONTROL METHOD, PROGRAM, AND RECORDING MEDIUM (71) Applicant: NEC Solution Innovators, Ltd., Tokyo (JP)

(72) Inventors: Kazuhide Umeda, Tokyo (JP); Suguru Eguchi, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 180 days.

(21) Appl. No.: 16/320,592

(22) PCT Filed: Mar. 30, 2017

(86) PCT No.: PCT/JP2017/013154
§ 371 (c)(1),
(2) Date: Jan. 25, 2019

(87) PCT Pub. No.: WO2018/020737
PCT Pub. Date: Feb. 1, 2018

(65) Prior Publication Data
US 2019/0161275 A1 May 30, 2019

(30) Foreign Application Priority Data

Jul. 29, 2016 (JP) .............................. JP2016-149715

(51) Int. Cl.
*B65G 1/137* (2006.01)
*G06Q 10/08* (2012.01)
(Continued)

(52) U.S. Cl.
CPC .............. *B65G 1/137* (2013.01); *G01V 8/00* (2013.01); *G01V 8/10* (2013.01); *G06Q 10/08* (2013.01);
(Continued)

(58) Field of Classification Search
CPC combination set(s) only.
See application file for complete search history.

(56) References Cited

U.S. PATENT DOCUMENTS 10,357,118 B2 * 7/2019 Swafford .............. A47F 5/0068
2005/0149414 A1 * 7/2005 Schrodt ................ G06Q 10/087
705/29
(Continued)

FOREIGN PATENT DOCUMENTS

JP  11-281754 A    10/1999
WO  2014/087560 A1  6/2014

OTHER PUBLICATIONS

International Search Report for PCT Application No. PCT/JP2017/013154, dated Jun. 20, 2017.
(Continued)

*Primary Examiner* — Kyle O Logan (57) ABSTRACT

The present invention provides a new stock control system that can grasp the stock status of objects to be controlled and is excellent in convenience. The stock control system of the present invention includes a shelf 10; a marker 11; an image acquisition unit 12; a storage unit; an analysis unit; and an alert unit. The shelf 10 is a shelf on which an object to be controlled 20 is placed. The marker 11 is disposed in the shelf 10 at a position where it is shielded from the image acquisition unit 12 due to the placed object to be controlled 20. The image acquisition unit 12 acquires an image of the marker 11. The storage unit updates and stores on-time stock information of the object to be controlled 20 placed on the shelf 10 based on sales information of the object to be controlled 20. The analysis unit analyzes, upon acquisition of the image of the marker 11 by the image acquisition unit 12, the on-time stock information in the storage unit. The alert unit outputs an alert according to an analysis result of the analysis unit.

20 Claims, 7 Drawing Sheets (51) Int. Cl.
*G01V 8/10* (2006.01)
*G01V 8/00* (2006.01)

(52) U.S. Cl.
CPC ..... *G06Q 10/087* (2013.01); *B65G 2203/041* (2013.01)

(56) References Cited

U.S. PATENT DOCUMENTS

| | | | |
|---|---|---|---|
| 2008/0052198 A1* | 2/2008 | Hosokawa | G06Q 10/087 705/28 |
| 2009/0066515 A1 | 3/2009 | Kangas | |
| 2014/0100769 A1* | 4/2014 | Wurman | G06Q 10/087 701/301 |
| 2015/0269516 A1* | 9/2015 | Fukuda | G06Q 30/06 705/28 |

OTHER PUBLICATIONS

Japanese Office Action for JP Application No. 2016-149715 dated Jan. 25, 2017 with English Translation.
Japanese Office Action for JP Application No. 2016-149715 dated Jun. 9, 2017 with English Translation.

\* cited by examiner

STOCK CONTROL SYSTEM, STOCK CONTROL METHOD, PROGRAM, AND RECORDING MEDIUM

This application is a National Stage Entry of PCT/JP2017/013154 filed on Mar. 30, 2017, which claims priority from Japanese Patent Application 2016-149715 filed on Jul. 29, 2016, the contents of all of which are incorporated herein by reference, in their entirety.

TECHNICAL FIELD

The present invention relates to a stock control system, a stock control method, a program, and a recording medium.

BACKGROUND ART

A stock control apparatus for automatically recognizing and controlling the stock status of pamphlets in a pamphlet display shelf has been proposed (Patent Literature 1). In this stock control apparatus, objects to be controlled (the pamphlets) are placed on a mark. If the mark is not recognized from the image obtained by an image pickup unit, it is determined that they still have the objects to be controlled, i.e., the stock of the objects to be controlled is sufficient, and if the mark is not recognized, it is determined that they do not have the objects to be controlled, i.e., the objects to be controlled are out of stock.

CITATION LIST

Patent Literature

Patent Literature 1: JPH11(1999)-281754 A

SUMMARY OF INVENTION

Technical Problem

The above described stock control apparatus only allows checking of the out-of-stock of the objects to be controlled without manpower. Thus, there is a demand for a new stock control system that can grasp the stock status of the objects to be controlled and is excellent in convenience.

Hence, the present invention is intended to provide a new stock control system, a stock control method, a program, and a recording medium that can grasp the stock status of objects to be controlled and are excellent in convenience.

Solution to Problem

In order to achieve the above object, the present invention provides a first stock control system including: a shelf; a marker; an image acquisition unit; a storage unit; an analysis unit; and an alert unit. The shelf is a shelf on which an object to be controlled is placed. The marker is disposed in the shelf at a position where it is shielded from the image acquisition unit due to the placed object to be controlled. The image acquisition unit acquires an image of the marker. The storage unit updates and stores on-time stock information of the object to be controlled placed on the shelf based on sales information of the object to be controlled. The analysis unit analyzes, upon acquisition of the image of the marker by the image acquisition unit, the on-time stock information in the storage unit. The alert unit outputs an alert according to an analysis result of the analysis unit.

The present invention also provides a second stock control system including: a shelf; a graduated marker; an image acquisition unit; an analysis unit; and an alert unit. The shelf is a shelf on which an object to be controlled is placed. The graduated marker is disposed inside the shelf at at least one of a side surface or a back surface. Each graduation of the graduated marker corresponds to a quantity of the object to be controlled placed on the shelf. The image acquisition unit acquires an image of the graduated marker. The analysis unit analyzes, upon acquisition of the image of the graduated marker by the image acquisition unit, a reduction quantity of the object to be controlled based on the quantity of the placed object to be controlled corresponding to the graduation in the acquired image. The alert unit outputs an alert according to an analysis result of the analysis unit.

The present invention also provides a first stock control method including: an image acquisition step of acquiring an image of a marker disposed in a shelf at a position obstructed by an object to be controlled placed on the shelf; a storage step of updating and storing on-time stock information of the object to be controlled on the shelf based on sales information of the object to be controlled; an analysis step of analyzing, upon acquisition of the image of the marker in the image acquisition step, the on-time stock information updated and stored in the storage step; and an outputting step of outputting an alert according to an analysis result in the analysis step.

The present invention also provides a second stock control method including: an image acquisition step of acquiring an image of a graduated marker disposed inside a shelf at at least one of a side surface or a back surface, each graduation of the graduated marker corresponding to a quantity of an object to be controlled placed on the shelf; an analysis step of analyzing, upon acquisition of the image of the graduated marker in the image acquisition step, a reduction quantity of the object to be controlled based on the quantity of the placed object to be controlled corresponding to the graduation in the acquired image; and an outputting step of outputting an alert according to an analysis result in the analysis step.

The present invention also provides a program that can execute the first or second stock control method according to the present invention on a computer.

The present invention also provides a computer-readable recording medium recorded with the program according to the present invention.

Advantageous Effects of Invention

According to the present invention, it is possible to provide a new stock control system, a stock control method, a program, and a recording medium that can grasp the stock status of objects to be controlled and are excellent in convenience.

DESCRIPTION OF EMBODIMENTS

In the first stock control system of the present invention, for example, upon acquisition of the image of the marker by the image acquisition unit, the analysis unit collates a threshold value with the on-time stock information in the storage unit, determines that the object to be controlled is stolen if the stock information exceeds the threshold value, and determines that the stock of the object to be controlled is insufficient if the stock information is equal to or less than the threshold value; and the alert unit outputs a theft alert if the analysis unit determines that the object to be controlled is stolen and outputs a stock shortage alert if the analysis unit determines that the stock of the object to be controlled is insufficient.

In the first stock control method of the present invention, for example, upon acquisition of the image of the marker in the image acquisition step, in the analysis step, a threshold value is collated with the on-time stock information updated and stored in the storage step, it is determined that the object to be controlled is stolen if the stock information exceeds the threshold value, and it is determined that the stock of the object to be controlled is insufficient if the stock information is equal to or less than the threshold value; and in the outputting step, a theft alert is output if it is determined that the object to be controlled is stolen in the analysis step and a stock shortage alert is output if it is determined that the stock of the object to be controlled is insufficient in the analysis step.

The first stock control system of the present invention further includes a point of sale (POS) unit, wherein the POS unit includes the storage unit, for example.

In the first stock control system and the first stock control method of the present invention, for example, the marker is disposed inside the shelf at at least one position selected from the group consisting of side surfaces, a back surface, and a bottom surface.

In the first stock control system of the present invention, for example, the marker is a graduated marker, each graduation of the graduated marker corresponds to a quantity of the object to be controlled placed on the shelf, and the analysis unit collates, upon acquisition of an image of the graduated marker by the image acquisition unit, the on-time stock information in the storage unit with the quantity of the placed object to be controlled corresponding to the graduation in the acquired image.

In the first stock control method of the present invention, for example, the marker is a graduated marker, each graduation of the graduated marker corresponds to the quantity of the object to be controlled placed on the shelf, and, upon acquisition of the image of the graduated marker in the image acquisition step, the on-time stock information updated and stored in the storage step is collated with the quantity of the placed object to be controlled corresponding to the graduation in the acquired image in the analysis step.

In the first stock control system of the present invention, for example, the analysis unit collates the on-time stock information in the storage unit with the quantity of the placed object to be controlled corresponding to the graduation in the acquired image, determines that the object to be controlled is stolen if the stock information does not match with the quantity of the placed object to be controlled, and determines that the stock of the object to be controlled is insufficient if the stock information matches with the quantity of the placed object to be controlled; and the alert unit outputs a theft alert if the analysis unit determines that the object to be controlled is stolen and outputs a stock shortage alert depending on the quantity of the placed object to be controlled if the analysis unit determines that the stock of the object to be controlled is insufficient.

In the first stock control method of the present invention, for example, in the analysis step, the on-time stock information updated and stored in the storage step is collated with the quantity of the placed object to be controlled corresponding to the graduation in the acquired image, it is determined that the object to be controlled is stolen if the stock information does not match with the quantity of the placed object to be controlled, and it is determined that the stock of the object to be controlled is insufficient if the stock information matches with the quantity of the placed object to be controlled; and, in the outputting step, a theft alert is output if it is determined that the object to be controlled is stolen in the analysis step, and a stock shortage alert depending on the quantity of the placed object to be controlled is output if it is determined that the stock of the object to be controlled is insufficient in the analysis step.

In the second stock control system of the present invention, for example, upon acquisition of the image of the graduated marker by the image acquisition unit, the analysis unit collates a threshold value with a reduction quantity of the object to be controlled, determines that the object to be controlled is stolen if the reduction quantity of the object to be controlled exceeds the threshold value, and determines that the stock of the object to be controlled is insufficient if the reduction quantity of the object to be controlled is equal to or less than the threshold value; and the alert unit outputs a theft alert if the analysis unit determines that the object to be controlled is stolen and outputs a stock shortage alert if the analysis unit determines that the stock of the object to be controlled is insufficient.

In the second stock control method of the present invention, for example, upon acquisition of the image of the graduated marker in the image acquisition step, in the analysis step, a threshold value is collated with a reduction quantity of the object to be controlled, it is determined that the object to be controlled is stolen if the reduction quantity of the object to be controlled exceeds the threshold value, and it is determined that the stock of the object to be controlled is insufficient if the reduction quantity of the object to be controlled is equal to or less than the threshold value; and, in the outputting step, a theft alert is output if it is determined that the object to be controlled is stolen in the analysis step and a stock shortage alert is output if it is determined that the stock of the object to be controlled is insufficient in the analysis step.

The first and second stock control systems of the present invention each further include a first human image acquisition unit, wherein the first human image acquisition unit acquires an image of a person who made contact with the object to be controlled on the shelf when the analysis unit determines that the object to be controlled is stolen, for example.

The first and second stock control methods of the present invention each further include a first human image acquisition step of acquiring an image of a person who made contact with the object to be controlled on the shelf when it is determined that the object to be controlled is stolen in the analysis step, for example.

The first and second stock control systems of the present invention each further include a second human image acquisition unit; and an image collation unit, wherein the second human image acquisition unit acquires an image of a person who exits from an exit of an area where the shelf is provided when the analysis unit determines that the object to be controlled is stolen, the image collation unit collates a first image acquired by the first human image acquisition unit with a second image acquired by the second human image acquisition unit, and the alert unit outputs an alert that a thief has escaped from the exit of the area if it is determined that a person of the first image and a person of the second image are the same person, for example.

The first and second stock control methods of the present invention each further include a second human image acquisition step of acquiring an image of a person who exits from an exit of an area where the shelf is provided when it is determined that the object to be controlled is stolen in the analysis step; and an image collation step of collating a first image acquired in the first human image acquisition step with a second image acquired in the second human image acquisition step, wherein an alert that a thief has escaped from the exit of the area is output if it is determined that a person of the first image and a person of the second image are the same person in the outputting step, for example.

In the first and second stock control systems of the present invention and the first and second stock control methods of the present invention, for example, the image of the person is at least one of a face image and a body image.

The example embodiments of the present invention are described below with reference to the drawings. It is to be noted, however, that the present invention is by no means limited or restricted by the following example embodiments. In the following FIGS. 1 to 8, identical parts are indicated with identical reference signs. Regarding the descriptions of the example embodiments, reference can be made to one another unless otherwise stated. Furthermore, the configurations of the example embodiments can be combined unless otherwise stated.

First Example Embodiment

The first example embodiment relates to an example of the first stock control system and the first stock control method of the present invention.

Figure 1A:
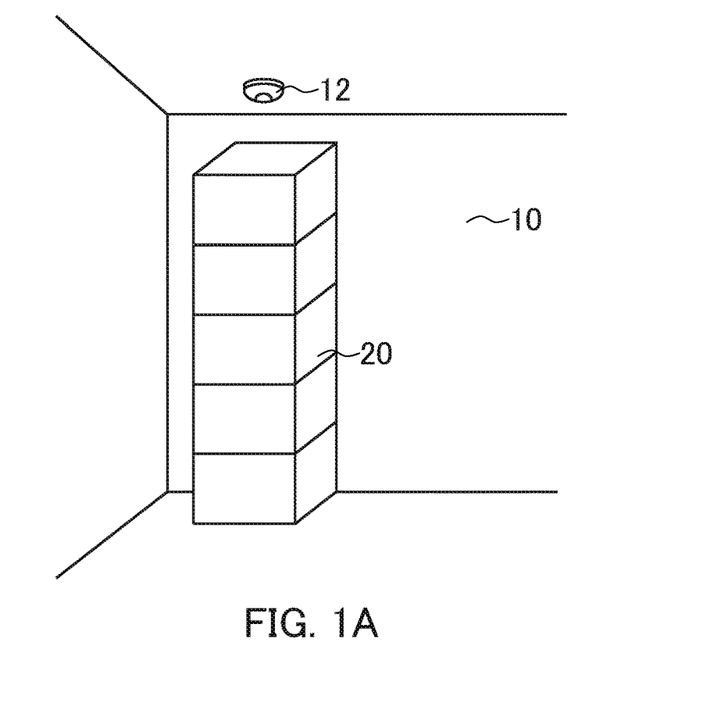
FIG. 1 is a schematic view showing a part of an example (first example embodiment) of the first stock control system of the present invention.
Figure 1B:
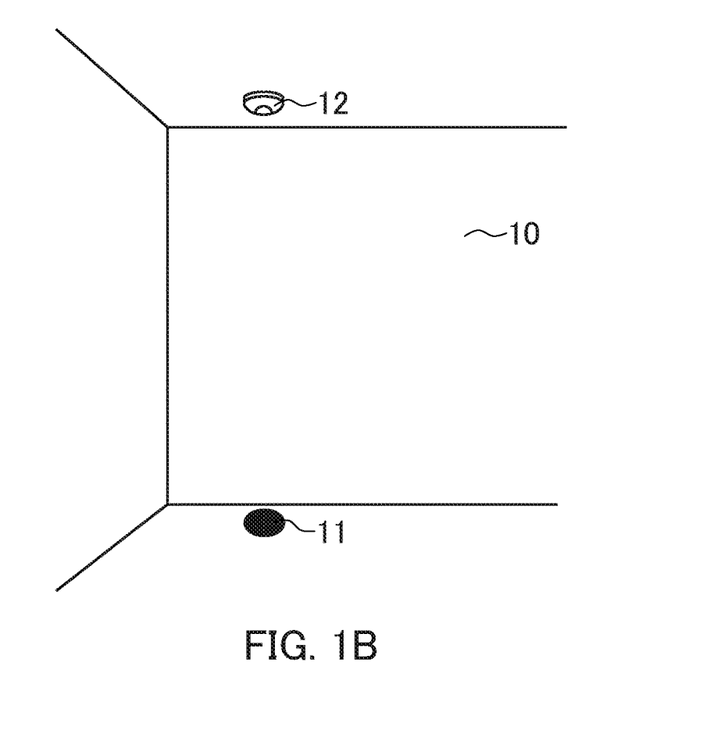
Figure 2:
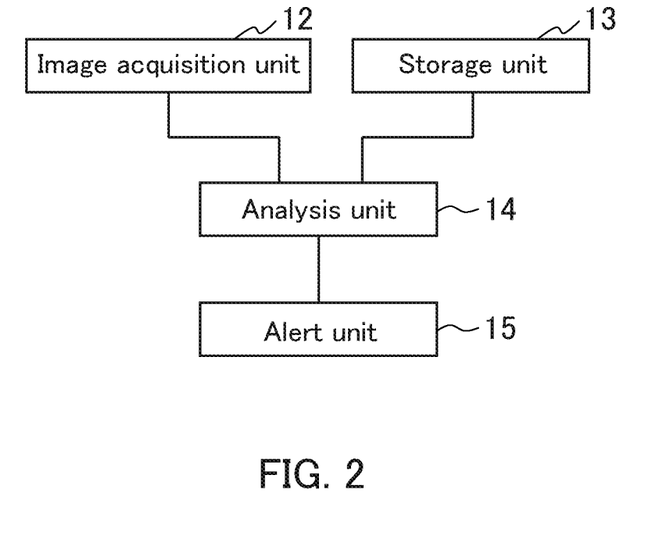
FIG. 2 is a block diagram showing a part of an example (first example embodiment) of the first stock control system of the present invention.

An example of the stock control system of the present example embodiment is described below with reference to FIGS. 1 and 2. As shown in FIGS. 1 and 2, the stock control system of the present example includes a shelf 10, a marker 11, an image acquisition unit 12, a storage unit 13, an analysis unit 14, and an alert unit 15.

The shelf 10 is a shelf on which objects to be controlled 20 are placed. The object to be controlled 20 is not particularly limited, and is, for example, an article that can be placed on a shelf 10, the stock of which being required to be controlled. More specifically, examples of the object to be controlled 20 include commodities in stores, items stored in warehouses, and magazines and pamphlets that are distributed free of charge. The store to which the stock control system and stock control method of the present invention can be applied is not particularly limited, and examples thereof include various stores having display shelfs of commodities such as drug stores, supermarkets, convenience stores, bookstores, mass retailers of home appliances, and the like. Besides these, the stock control system and stock control method of the present invention can be applied to, for example, factories and laboratories. In such cases, raw materials, reagents, and the like can be controlled as objects to be controlled.

The marker 11 is disposed in the shelf 10 where it is shielded from the image acquisition unit 12 due to the placed objects to be controlled 20. For example, the marker 11 is disposed on the bottom surface of the shelf 10 as shown in (B) of FIG. 1, and the marker 11 is shielded from the image acquisition unit 12 in the state where the objects to be controlled 20 are placed on the shelf 10 as shown in (A) of FIG. 1. However, (B) of FIG. 1 is merely an example, and the marker 11 may be disposed at any position on the shelf 10 as long as it is shielded from the image acquisition unit 12 due to the placed objects to be controlled 20.

In the example shown in (B) of FIG. 1, the marker 11 is a black circle. The present invention, however, is not limited thereto. The marker 11 may be any marker as long as the image thereof can be acquired by the image acquisition unit 12, and examples thereof include one-dimensional codes such as a bar code and the like and two-dimensional codes such as a QR code® and the like. The one-dimensional code and the two-dimensional code may contain information relating to the objects to be controlled 20 and the like.

Figure 8A:
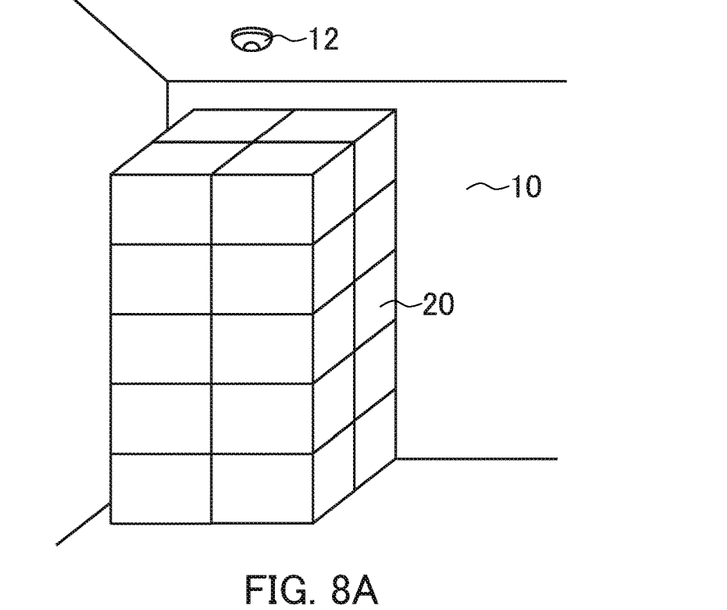
FIG. 8 is a schematic view showing a part of another variation (first example embodiment) of the first stock control system of the present invention.
Figure 8B:
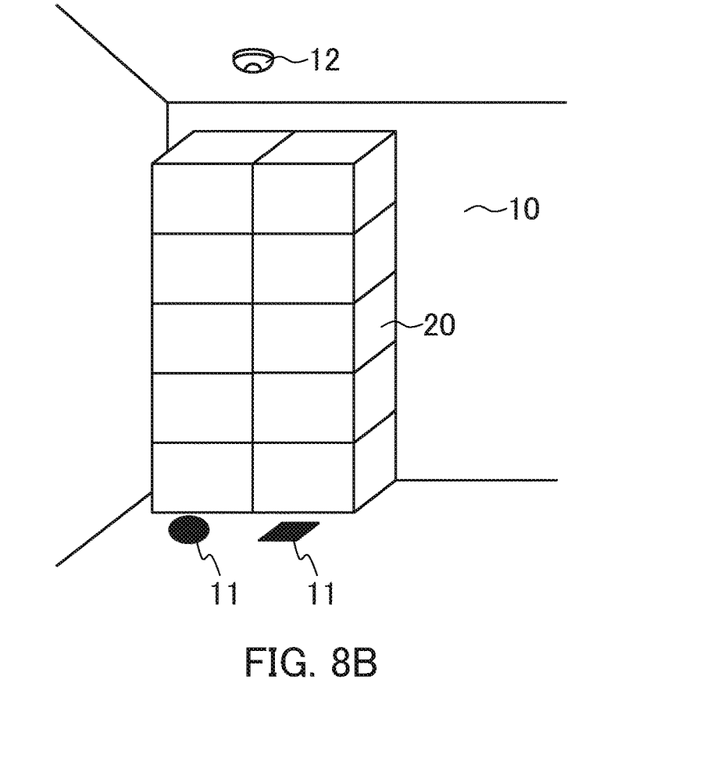

In the stock control system of the present invention, for example, as shown in (A) and (B) of FIG. 8, the marker 11 may be more than one (two or more). When the stock control system includes more than one marker 11, for example, all the markers 11 may be of the same type or different types. In the example shown in (B) of FIG. 8, a black circle marker 11 is disposed in the display area of high-cost commodities, and a black square marker 11 is disposed in the display area of low-cost commodities. It is to be noted that (B) of FIG. 8 is merely an example, and the stock control system may include three or more markers 11, which may be of the same type or different types. The same applies to the second to fifth example embodiments.

The image acquisition unit 12 acquires the image of the marker 11. The image acquisition unit 12 is not particularly limited and may be, for example, a camera. The position where the image acquisition unit 12 is provided is not particularly limited, and the image acquisition unit 12 may be provided at an appropriate position where it can acquire the image of the marker 11. For example, while the image acquisition unit 12 is provided on the top surface of the shelf 10 in (A) and (B) of FIG. 1, if the shelf 10 does not have the top surface, the image acquisition unit 12 may be provided on the ceiling above the area where the shelf 10 is provided, or the image acquisition unit 12 may be provided at any position, other than the ceiling above the area where the shelf 10 is provided, where the image of the marker 11 can be acquired.

The storage unit 13 updates and stores on-time stock information of the objects to be controlled 20 on the shelf 10 based on sales information of the objects to be controlled 20. As described above, the first stock control system of the present invention may further include a POS unit, and the POS unit may include the storage unit 13, for example. The POS unit may be, for example, a POS system.

The analysis unit 14 analyzes, upon acquisition of the image of the marker 11 by the image acquisition unit 12, the on time stock information in the storage unit 13. The analysis unit 14 may be, for example, a central processing unit (CPU) or the like.

The alert unit 15 outputs an alert according to the analysis result of the analysis unit 14. Examples of the alert unit 15 include an alarm that emits a warning sound and a patrol lamp that emits a warning light. The alert unit 15 may be, for example, a unit that transmits a warning signal to a terminal or the like possessed by a person in charge of the objects to be controlled 20 such as a store clerk.

The first stock control method using the first stock control system of the present invention is described below with reference to an example. In this example, upon acquisition of the image of the marker 11 by the image acquisition unit 12, first, the analysis unit 14 collates a threshold value with the on-time stock information in the storage unit 13. Then, the analysis unit 14 determines that the object(s) to be controlled 20 is stolen if the stock information exceeds the threshold value and determines that the stock of the objects to be controlled 20 is insufficient if the stock information is equal to or less than the threshold value.

For example, the determination can be made as follows. As described above, the marker 11 is disposed at a position where it is shielded from the image acquisition unit 12 due to the placed objects to be controlled 20. Thus, the situation in which the image acquisition unit 12 acquires the image of the marker 11 means that the marker 11 is exposed, i.e., the quantity of the placed objects to be controlled 20 is reduced. The analysis unit 14 collates a threshold value with the on-time stock information in the storage unit 13 when the quantity of the placed objects to be controlled 20 is reduced. The case in which the stock information exceeds the threshold value as the result of the collation is the case in which the stock quantity based on the sales information is large. This case can be the state in which, despite of the large stock quantity based on the sales information, the quantity of the placed objects to be controlled 20 is small. Thus, in this case, the analysis unit 14 determines that the object(s) to be controlled 20 is stolen. On the other hand, the case in which the stock information is equal to or less than the threshold value as the result of the collation is the case in which the stock quantity based on the sales information is small. This case can be the state in which the quantity of the stock based on the sales information is small and the quantity of the placed objects to be controlled is small. Thus, in this case, the analysis unit 14 determines not that the object(s) to be controlled 20 is stolen but that the stock of the objects to be controlled 20 is insufficient.

The threshold value can be set appropriately depending on the number of objects to be controlled 20 usually purchased at the same time. For example, the threshold value is 2 or 3. For example, when the threshold value is 2, as shown in (A) and (B) of FIG. 1, the analysis unit 14 determines that the object(s) to be controlled 20 is stolen if the image acquisition unit 12 acquires the image of the marker 11 while the stock information is 5. On the other hand, for example, when the threshold value is 2, the analysis unit 14 determines that the stock of the objects to be controlled 20 is insufficient if the image acquisition unit 12 acquires the image of the marker 11 while the stock information is 1 or 2. That is, as shown in (B) of FIG. 1, when the marker 11 is disposed on the bottom surface of the shelf 10, it is determined that the object to be controlled 20 is out of stock.

Furthermore, the acquisition time may be measured at the time of acquiring the image of the marker 11 by the image acquisition unit 12. Thereby, it is possible to grasp the occurrence time of the shortage of stock or theft. The same applies to the second to fifth example embodiments.

Subsequently, the alert unit 15 outputs a theft alert if the analysis unit 14 determines that the object(s) to be controlled 20 is stolen and outputs a stock shortage alert if the analysis unit 14 determines that the stock of the objects to be controlled 20 is insufficient. The theft alert and the stock shortage alert may be distinguishable from each other by, for example, the difference in a type of the warning sound, a flashing method or a color of the patrol lamp, or the like.

As described above, according to the first stock control system of the present invention shown in FIGS. 1 and 2, for example, by collating a threshold value with on-time stock information in the storage unit 13, it is possible to determine whether the object(s) to be controlled 20 is stolen or the stock of the objects to be controlled 20 is insufficient and to output an alert corresponding to the determination.

Figure 3A:
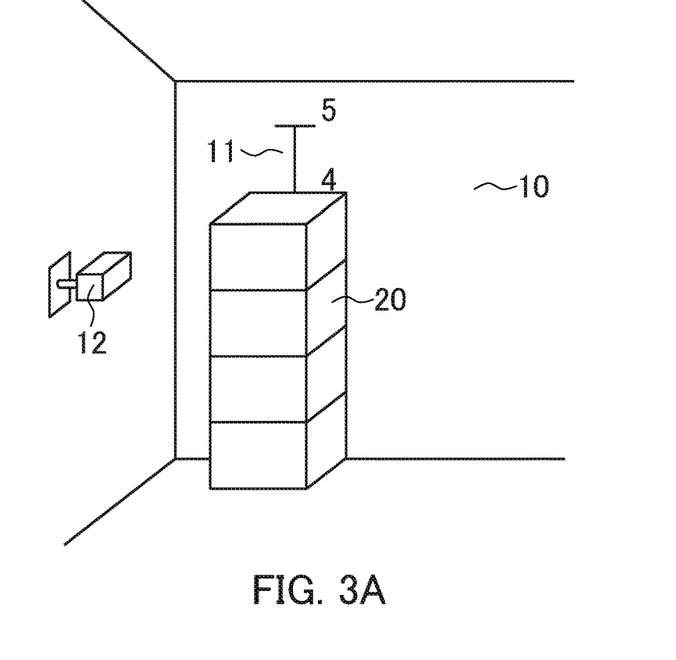
FIG. 3 is a schematic view showing a part of a variation (first example embodiment) of the first stock control system of the present invention and a part of an example (second example embodiment) of the second stock control system of the present invention.
Figure 3B:
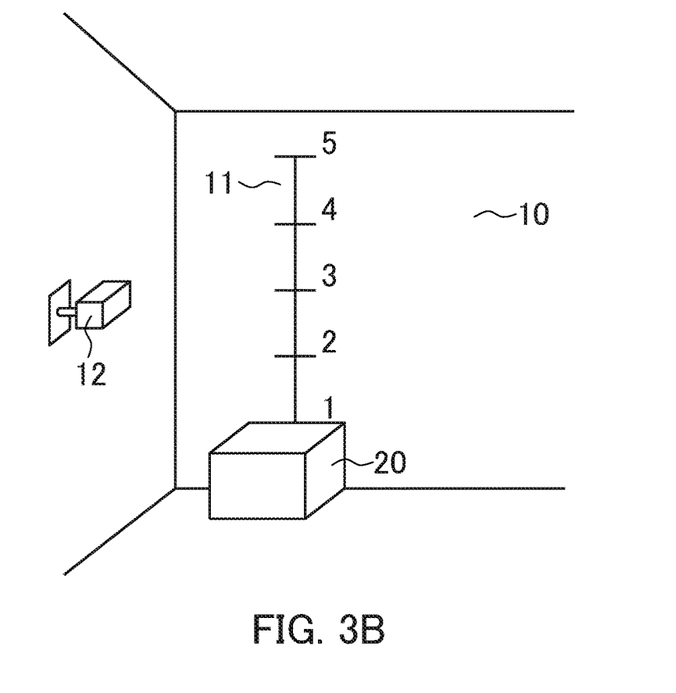

Next, a variation of the stock control system and stock control method of the present example embodiment is described below with reference to FIG. 3. As shown in FIG. 3, the stock control system of the present variation is the same as the stock control system shown in FIGS. 1 and 2, except that the marker 11 is a graduated marker disposed on the back surface of the shelf 10 and the image acquisition unit 12 is provided on the left side surface of the shelf 10 so that it can acquire the image of the graduated marker 11. As shown in (A) and (B) of FIG. 3, each graduation of the graduated marker 11 corresponds to the quantity of the placed objects to be controlled 20.

Also in the stock control system of the present variation, the graduated marker 11 may be disposed at any position on the shelf 10 as long as it is shielded from the image acquisition unit 12 due to the placed objects to be controlled 20. Furthermore, also in the stock control system of the present variation, the position where the image acquisition unit 12 is provided is not particularly limited, and the image acquisition unit 12 may be provided at an appropriate position where it can acquire the image of the marker 11. For example, the image acquisition unit 12 may be provided on the right side surface of the shelf 10 and the graduated marker 11 may be disposed on the left side surface of the shelf 10 so that the graduated marker 11 is shielded from the image acquisition unit 12 due to the placed objects to be controlled 20.

Next, the stock control method using the stock control system of the present variation is described below with reference to an example. In this variation, upon acquisition of the image of the marker 11 by the image acquisition unit 12, first, the analysis unit 14 collates the on-time stock information in the storage unit 13 with the quantity of the placed objects to be controlled 20 corresponding to the graduation in the acquired image. Then, the analysis unit 14 determines that the object(s) to be controlled 20 is stolen if the stock information does not match with the quantity of the placed objects to be controlled 20 and determines that the stock of the objects to be controlled is insufficient if the stock information matches with the quantity of the placed objects to be controlled 20. For example, as shown in (A) and (B) of FIG. 3, the analysis unit 14 determines that the object(s) to be controlled 20 is stolen if the stock information is 4 and the quantity of the placed objects to be controlled 20 is 1, i.e., the stock information does not match with the quantity of the placed objects to be controlled 20. On the other hand, for example, the analysis unit 14 determines that the stock of the objects to be controlled 20 is insufficient if the stock information is 1 and the quantity of the placed objects to be controlled 20 is 1, i.e., the stock information matches with the quantity of the placed objects to be controlled 20.

Subsequently, the alert unit 15 outputs a theft alert if the analysis unit 14 determines that the object(s) to be controlled 20 is stolen and outputs a stock shortage alert depending on the quantity of the placed objects to be controlled 20 if the analysis unit 14 determines that the stock of the objects to be controlled 20 is insufficient.

According to the stock control system of this variation, for example, by collating on-time stock information in the storage unit 13 with the quantity of the placed objects to be controlled 20 corresponding to the graduation, it is possible to determine whether the object(s) to be controlled 20 is stolen or the stock of the objects to be controlled 20 is insufficient and to output an alert corresponding to the determination.

Second Example Embodiment

The second example embodiment relates to an example of the second stock control system and stock control method of the present invention.

Figure 4:
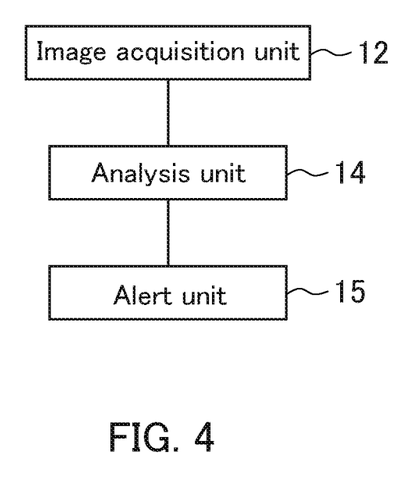
FIG. 4 is a block diagram showing a part of an example (second example embodiment) of the second stock control system of the present invention.

An example of the stock control system of the present example embodiment is described below with reference to FIGS. 3 and 4. As shown in FIGS. 3 and 4, the stock control system of the present example is the same as the stock control system of the variation of the first example embodiment except that it does not include a storage unit 13.

In the stock control system of the present example embodiment, the analysis unit 14 analyzes, upon acquisition of the image of the graduated marker 11 by the image acquisition unit 12, the reduction quantity of the objects to be controlled 20 based on the quantity of the placed objects to be controlled 20 corresponding to the graduation in the acquired image, and the alert unit 15 outputs an alert according to the analysis result of the analysis unit 14.

The second stock control method using the second stock control system of the present invention is described below with reference to an example. In this example, upon acquisition of the image of the graduated marker 11 by the image acquisition unit 12, first, the analysis unit 14 collates a threshold value with the reduction quantity of the objects to be controlled 20. Then, the analysis unit 14 determines that the object(s) to be controlled 20 is stolen if the reduction quantity of the objects to be controlled 20 exceeds the threshold value and determines that the stock of the objects to be controlled 20 is insufficient if the reduction quantity of the objects to be controlled 20 is equal to or less than the threshold value.

For example, the determination can be made as follows. As described above, the graduated marker 11 is disposed inside the shelf at at least one of a side surface and a back surface. That is, the graduated marker 11 is disposed at a position where it is shielded from the image acquisition unit 12 due to the placed objects to be controlled 20. Thus, the situation in which the image acquisition unit 12 acquires the image of the graduated marker 11 means that the graduated marker 11 is exposed, i.e., the quantity of the placed objects to be controlled 20 is reduced. The analysis unit 14 collates a threshold value with the reduction quantity of the objects to be controlled 20 when the quantity of the objects to be controlled 20 is reduced. The case in which the reduction quantity of the objects to be controlled 20 exceeds the threshold value as the result of the collation is the case in which the reduction quantity of the objects to be controlled 20 is large. In this case, it can be said that the quantity of the placed objects to be controlled 20 is reduced and the reduction quantity is larger than the usual reduction quantity. Thus, in this case, the analysis unit 14 determines that the object(s) to be controlled 20 is stolen. On the other hand, the case in which the reduction quantity of the objects to be controlled 20 is equal to or less than the threshold value as the result of the collation is a case in which the reduction quantity of the objects to be controlled 20 is small. In this case, it can be said that the quantity of the placed objects to be controlled 20 is small and the reduction quantity is within a normal range. Thus, in this case, the analysis unit 14 determines that the stock of the objects to be controlled 20 is insufficient.

For example, when the threshold value is 2, as shown in (A) and (B) of FIG. 3, the analysis unit 14 determines that the object(s) to be controlled 20 is stolen if the reduction quantity of the objects to be controlled 20 is 3. On the other hand, for example, when the threshold value is 3, the analysis unit 14 determines that the stock of the objects to be controlled 20 is insufficient if the reduction quantity of the objects to be controlled 20 is 3.

Subsequently, the alert unit 15 outputs a theft alert if the analysis unit 14 determines that the object(s) to be controlled 20 is stolen and outputs a stock shortage alert if the analysis unit 14 determines that the stock of the objects to be controlled 20 is insufficient.

According to the stock control system of this example, for example, by collating a threshold value with the reduction quantity of the objects to be controlled 20, it is possible to determine whether the object(s) to be controlled 20 is stolen or the stock of the objects to be controlled 20 is insufficient and to output an alert corresponding to the determination.

Third Example Embodiment

The third example embodiment relates to another example of the first stock control system of the present invention.

Figure 5A:
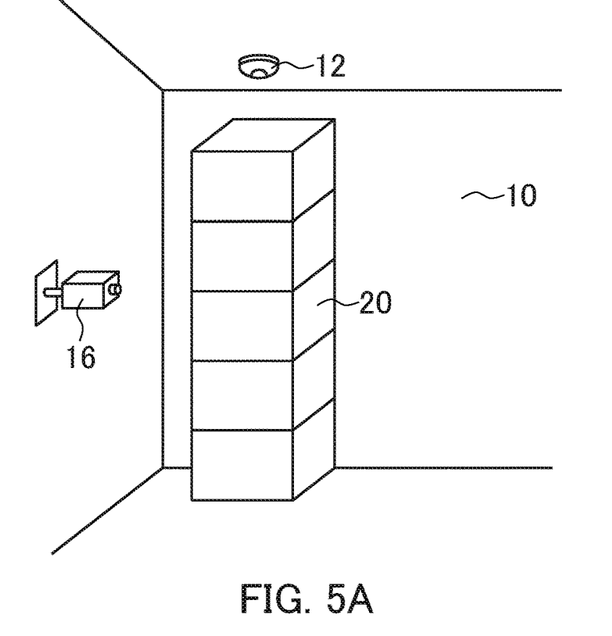
FIG. 5 is a schematic view showing a part of another example (third example embodiment) of the first stock control system of the present invention.
Figure 5B:
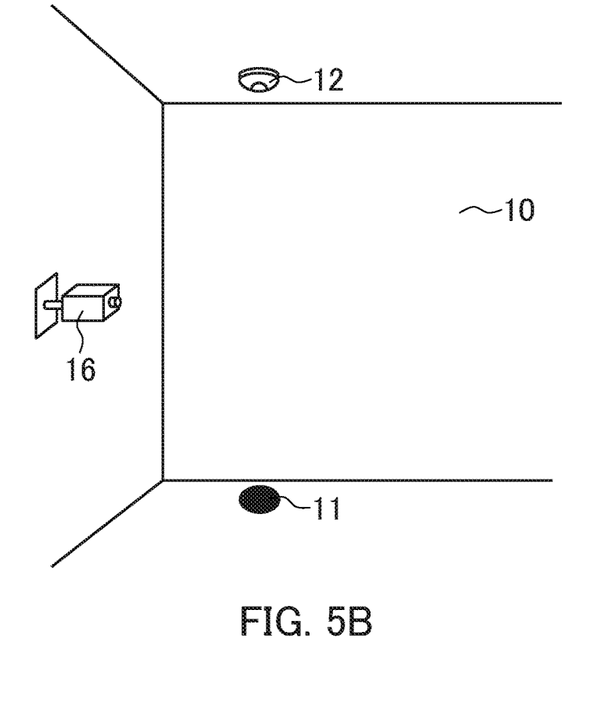

An example of the stock control system of the present example embodiment is described below with reference to FIGS. 5 and 2. As shown in FIGS. 5 and 2, the stock control system of the present example is the same as the stock control system of the first example embodiment shown in FIGS. 1 and 2 except that it further includes a first human image acquisition unit 16.

The first human image acquisition unit 16 acquires the image of the person who made contact with the object(s) to be controlled 20 on the shelf 10 when the analysis unit 14 determines that the object(s) to be controlled 20 is stolen. The first human image acquisition unit 16 is not particularly limited, and may be, for example, a camera or the like. The position where the first human image acquisition unit 16 is provided is not particularly limited, and the first human image acquisition unit 16 may be provided at an appropriate position where it can acquire the image of the person who made contact with the object(s) to be controlled 20 on the shelf 10. For example, while the first human image acquisition unit 16 is provided on the left side surface of the shelf 10 in (A) and (B) of FIG. 5, the first human image acquisition unit 16 may be provided at any position as long as it can acquire the image of the person in the area where the shelf 10 is provided. The image of the person is, for example, an image capable of identifying a person who made contact with the object(s) to be controlled 20 on the shelf 10, and may be a face image, a body image, or the like. While the image acquisition unit 12 that acquires the image of the marker 11 may also serve as the first human image acquisition unit 16, preferably, the first human image acquisition unit 16 is provided separately from the image acquisition unit 12 as shown in (A) and (B) of FIG. 5, from the viewpoint of the identification accuracy of the person.

According to the stock control system of the present example embodiment, in addition to the effect obtained by the stock control system of the first example embodiment shown in FIGS. 1 and 2, an evidential image that identifies a suspect of the thief can be obtained. While the present example embodiment is described above with reference to the case in which the stock control system of the first example embodiment shown in FIGS. 1 and 2 further includes the first human image acquisition unit as an example, the same effect as in the present example embodiment can be obtained also in the case in which the stock control system of the variation of the first embodiment or the stock control system of the second example embodiment further includes the first human image acquisition unit.

Fourth Example Embodiment

The fourth example embodiment relates to still another example of the first stock control system of the present invention.

Figure 6:
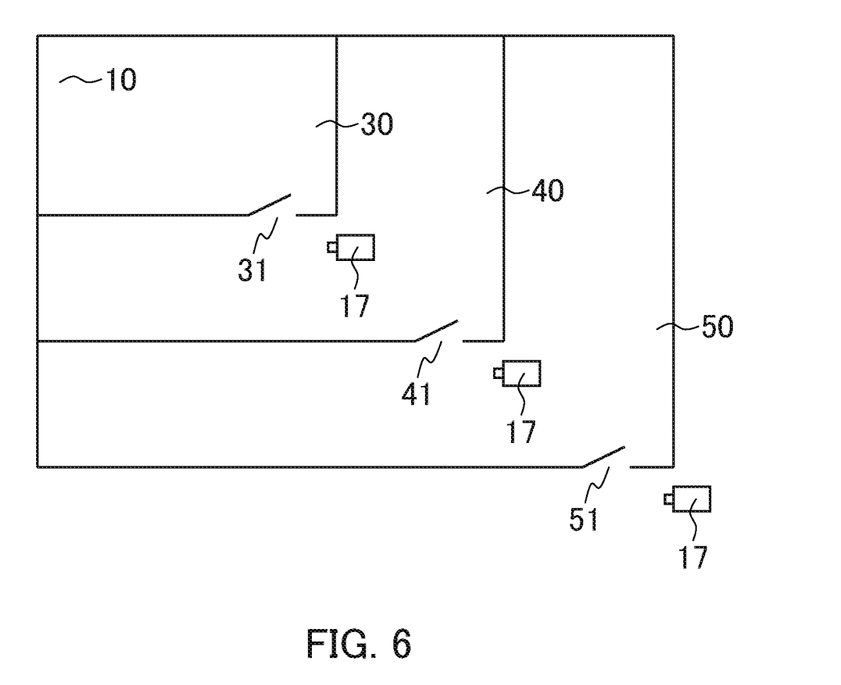
FIG. 6 is a schematic view showing a part of still another example (fourth example embodiment) of the first stock control system of the present invention.
Figure 7:
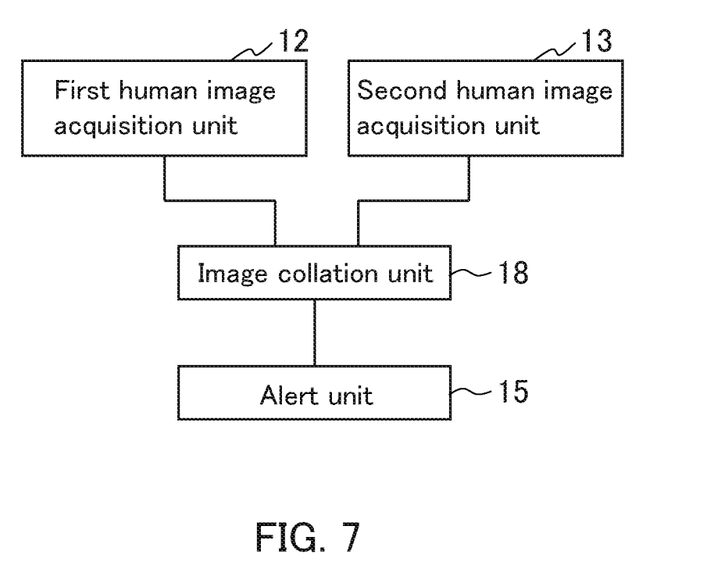
FIG. 7 is a block diagram showing a part of still another example (fourth example embodiment) of the first stock control system of the present invention.

An example of the stock control system of the present example embodiment is described below with reference to FIGS. 6 and 7. As shown in FIGS. 6 and 7, the stock control system of the present example is the same as the stock control system of the third example embodiment except that it further includes a second human image acquisition unit 17 and an image collation unit 18.

The second human image acquisition unit 17 acquires the image of the person who exits from the exit of an area where the shelf 10 is provided when the analysis unit 14 determines that the object(s) to be controlled 20 is stolen. The second human image acquisition unit 17 is not particularly limited, and may be, for example, a camera or the like. Examples of the position where the second human image acquisition unit 17 is provided include an exit 31 of an area 30 where the shelf 10 is provided, an exit 41 of a store 40 including the area 30, and an exit 51 of a building 50 including the store 40 as shown in FIG. 6. The second human image acquisition units 17 may be provided at these positions to acquire the images of the person at a plurality of positions.

An image collation unit 18 collates the first image acquired by the first human image acquisition unit 16 with the second image acquired by the second human image acquisition unit 17. The image collation unit 18 is not particularly limited, and may be, for example, a CPU or the like, and the analysis unit 14 may also have the function of the image collation unit 18. There is no particular limitation on the collation method conducted by the image collation unit 18, and examples thereof include conventionally known person authentication methods including a method of calculating the similarity between the first image and the second image; a method of using the ratio of distances between feature points such as eyes, a nose, and a mouth; and a method of using a feature amount such as the direction of a line connecting the feature points.

In the stock control system of the present example embodiment, the alert unit 15 outputs an alert that a thief has escaped from the exit of the area if it is determined that the person of the first image and the person of the second image are the same person. This alert may be distinguishable from the theft alert or the stock shortage alert by, for example, the difference in a type of the warning sound, a flashing method or a color of the patrol lamp, or the like.

According to the stock control system of the present example embodiment, in addition to the effect obtained by the stock control system of the third example embodiment, it is possible to output a re-alert for the escape of the thief.

Fifth Example Embodiment

The program according to the present example embodiment is a program that can execute the above described stock control method on a computer. The program of the present example embodiment may be recorded on, for example, a computer-readable recording medium. The recording medium is not particularly limited, and examples thereof include random access memories (RAMs), read-only memories (ROMs), hard disks (HDs), optical disks, and Floppy® disks (FDs).

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2016-149715 filed on Jul. 29, 2016. The entire subject matter of the Japanese Patent Application is incorporated herein by reference.

INDUSTRIAL APPLICABILITY

The stock control system and stock control method of the present invention can determine whether the object(s) to be controlled is stolen or the stock of the objects to be controlled 20 is insufficient and to output an alert corresponding to the determination. Thus, the stock control system and stock control method of the present invention are extremely useful, for example, in the stock control of commodities in stores, items stored in warehouses, and the like.

REFERENCE SIGNS LIST 10 shelf
11 marker
12 image acquisition unit
13 storage unit
14 analysis unit
15 alert unit
16 first human image acquisition unit
17 second human image acquisition unit
18 image collation unit
20 object to be controlled

What is claimed is:
1. A stock control system comprising:
a storage unit;
an analysis unit; and
an alert unit, wherein
the storage unit updates and stores on-time stock information of an object to be controlled placed on a shelf based on sales information of the object to be controlled,
the analysis unit collates, upon acquisition of the image of a marker by an image acquisition unit, a threshold value with the on-time stock information in the storage unit, determines that the object to be controlled is stolen if the stock information exceeds the threshold value, and determines that the stock of the object to be controlled is insufficient if the stock information is equal to or less than the threshold value, the marker is disposed in a shelf at a position obstructed by the object to be controlled placed on the shelf, and the alert unit outputs a theft alert if the analysis unit determines that the object to be controlled is stolen and outputs a stock shortage alert if the analysis unit determines that the stock of the object to be controlled is insufficient.

2. The stock control system according to claim 1, further comprising:

a point of sale (POS) unit, wherein the POS unit comprises the storage unit.

3. The stock control system according to claim 1, wherein the marker is disposed inside the shelf at at least one position selected from the group consisting of side surfaces, a back surface, and a bottom surface.

4. The stock control system according to claim 1, wherein the marker is a graduated marker, each graduation of the graduated marker corresponds to a quantity of the object to be controlled placed on the shelf, and the analysis unit, upon acquisition of an image of the graduated marker by the image acquisition unit, collates the on-time stock information in the storage unit with the quantity of the placed object to be controlled corresponding to the graduation in the acquired image.

5. The stock control system according to claim 4, wherein the analysis unit collates the on-time stock information in the storage unit with the quantity of the placed object to be controlled corresponding to the graduation in the acquired image, determines that the object to be controlled is stolen if the stock information does not match with the quantity of the placed object to be controlled, and determines that the stock of the object to be controlled is insufficient if the stock information matches with the quantity of the placed object to be controlled, and the alert unit outputs a theft alert if the analysis unit determines that the object to be controlled is stolen and outputs a stock shortage alert depending on the quantity of the placed object to be controlled if the analysis unit determines that the stock of the object to be controlled is insufficient.

6. The stock control system according to claim 1, further comprising:

a first human image acquisition unit, wherein the first human image acquisition unit acquires an image of a person who made contact with the object to be controlled on the shelf when the analysis unit determines that the object to be controlled is stolen.

7. The stock control system according to claim 6, further comprising:

a second human image acquisition unit; and an image collation unit, wherein the second human image acquisition unit acquires an image of a person who exits from an exit of an area where the shelf is provided when the analysis unit determines that the object to be controlled is stolen, the image collation unit collates a first image acquired by the first human image acquisition unit with a second image acquired by the second human image acquisition unit, and the alert unit outputs an alert that a thief has escaped from the exit of the area if it is determined that a person of the first image and a person of the second image are the same person.

8. The stock control system according to claim 6, wherein the image of the person is at least one of a face image or a body image.

9. A stock control system comprising:

an analysis unit; and an alert unit, wherein the analysis unit analyzes, upon acquisition of an image of a graduated marker by an image acquisition unit, a reduction quantity of an object to be controlled based on a quantity of the placed object to be controlled corresponding to a graduation in the acquired image, the graduated marker is disposed inside a shelf at at least one of a side surface or a back surface, each graduation of the graduated marker corresponding to the quantity of the object to be controlled placed on the shelf, and the alert unit outputs an alert according to an analysis result of the analysis unit.

10. The stock control system according to claim 9, wherein upon acquisition of the image of the graduated marker by the image acquisition unit, the analysis unit collates a threshold value with a reduction quantity of the object to be controlled, determines that the object to be controlled is stolen if the reduction quantity of the object to be controlled exceeds the threshold value, and determines that the stock of the object to be controlled is insufficient if the reduction quantity of the object to be controlled is equal to or less than the threshold value, and the alert unit outputs a theft alert if the analysis unit determines that the object to be controlled is stolen and outputs a stock shortage alert if the analysis unit determines that the stock of the object to be controlled is insufficient.

11. The stock control system according to claim 10, further comprising:

a first human image acquisition unit, wherein the first human image acquisition unit acquires an image of a person who made contact with the object to be controlled on the shelf when the analysis unit determines that the object to be controlled is stolen.

12. The stock control system according to claim 11, further comprising:

a second human image acquisition unit; and an image collation unit, wherein the second human image acquisition unit acquires an image of a person who exits from an exit of an area where the shelf is provided when the analysis unit determines that the object to be controlled is stolen, the image collation unit collates a first image acquired by the first human image acquisition unit with a second image acquired by the second human image acquisition unit, and the alert unit outputs an alert that a thief has escaped from the exit of the area if it is determined that a person of the first image and a person of the second image are the same person.

13. The stock control system according to claim 11, wherein the image of the person is at least one of a face image or a body image.

14. A stock control method comprising:
acquiring an image of a marker disposed in a shelf at a position obstructed by an object to be controlled placed on the shelf;
updating and storing on-time stock information of the object to be controlled on the shelf based on sales information of the object to be controlled;
collating, upon acquisition of the image of the marker, a threshold with the on-time stock information updated and stored, determining that the object to be controlled is stolen if the stock information exceeds the threshold value, and determining that the stock of the object to be controlled is insufficient if the stock information is equal to or less than the threshold value;
outputting a theft alert if it is determined that the object to be controlled is stolen; and
outputting a stock shortage alert if it is determined that the stock of the object to be controlled is insufficient.

15. The method according to claim 14, wherein
the marker is disposed inside the shelf at at least one position selected from the group consisting of side surfaces, a back surface, and a bottom surface.

16. The method according to claim 14, wherein
the marker is a graduated marker,
each graduation of the graduated marker corresponds to the quantity of the object to be controlled placed on the shelf, and
upon acquisition of the image of the graduated marker, the on-time stock information updated and stored is collated with the quantity of the placed object to be controlled corresponding to the graduation in the acquired image.

17. The method according to claim 16, wherein
the on-time stock information updated and stored is collated with the quantity of the placed object to be controlled corresponding to the graduation in the acquired image, it is determined that the object to be controlled is stolen if the stock information does not match with the quantity of the placed object to be controlled, and it is determined that the stock of the object to be controlled is insufficient if the stock information matches with the quantity of the placed object to be controlled, and
a theft alert is output if it is determined that the object to be controlled is stolen and a stock shortage alert depending on the quantity of the placed object to be controlled is output if it is determined that the stock of the object to be controlled is insufficient.

18. A non-transitory computer-readable recording medium recorded with a program that can execute the stock control method according to claim 14.

19. A stock control system comprising:
a storage unit;
an analysis unit; and
an alert unit, wherein
the storage unit updates and stores on-time stock information of an object to be controlled placed on a shelf based on sales information of the object to be controlled,
the analysis unit analyzes, upon acquisition of an image of a maker by an image acquisition unit, the on-time stock information in the storage unit,
the marker is disposed in a shelf at a position obstructed by the object to be controlled placed on the shelf, and
the alert unit outputs an alert according to an analysis result of the analysis unit,
wherein the marker is a graduated marker,
each graduation of the graduated marker corresponds to a quantity of the object to be controlled placed on the shelf, and
the analysis unit, upon acquisition of an image of the graduated marker by the image acquisition unit, collates the on-time stock information in the storage unit with the quantity of the placed object to be controlled corresponding to the graduation in the acquired image.

20. A stock control method comprising:
acquiring an image of a marker disposed in a shelf at a position obstructed by an object to be controlled placed on the shelf;
updating and storing on-time stock information of the object to be controlled on the shelf based on sales information of the object to be controlled;
analyzing, upon acquisition of the image of the marker, the on-time stock information updated and stored; and
outputting an alert according to an analysis result,
wherein the marker is a graduated marker, each graduation of the graduated marker corresponds to the quantity of the object to be controlled placed on the shelf, and upon acquisition of the image of the graduated marker, the on-time stock information updated and stored is collated with the quantity of the placed object to be controlled corresponding to the graduation in the acquired image.

* * * * *